United States Patent [19]

Albertazzi

[11] 4,364,181

[45] Dec. 21, 1982

[54] APPARATUS FOR CHECKING THE CAGE OF A CONSTANT VELOCITY JOINT

[75] Inventor: Gastone Albertazzi, Bologna, Italy

[73] Assignee: Finike Italiana Marposs, S.p.A., S. Marino di Bentivoglio (BO), Italy

[21] Appl. No.: 246,425

[22] Filed: Mar. 23, 1981

Related U.S. Application Data

[63] Continuation-in-part of Ser. No. 74,653, Sep. 12, 1979, abandoned.

[30] Foreign Application Priority Data

Sep. 25, 1978 [IT] Italy .................................. 3539 A/78

[51] Int. Cl.³ .............................................. G01B 7/00
[52] U.S. Cl. ............................. 33/174 L; 33/DIG. 17
[58] Field of Search ..................... 33/174 L, DIG. 17; 209/602, 604; 364/560, 561

[56] References Cited

U.S. PATENT DOCUMENTS

| 3,166,852 | 1/1965 | Whitney ............................ 33/174 L |
| 3,869,800 | 3/1975 | Bartlett et al. ..................... 33/174 L |
| 4,084,322 | 4/1978 | Albertazzi ......................... 33/174 L |
| 4,181,958 | 1/1980 | Juengel et al. ..................... 33/174 L |

FOREIGN PATENT DOCUMENTS

| 2851927 | 6/1979 | Fed. Rep. of Germany .... 33/174 L |
| 78021 | 10/1931 | Sweden ............................. 33/174 L |
| 585575 | 2/1947 | United Kingdom .............. 33/174 L |
| 1436721 | 5/1976 | United Kingdom . |
| 1477508 | 6/1977 | United Kingdom . |
| 1492401 | 11/1977 | United Kingdom . |
| 1525697 | 9/1978 | United Kingdom . |

Primary Examiner—Richard R. Stearns
Attorney, Agent, or Firm—Stevens, Davis, Miller & Mosher

[57] ABSTRACT

The apparatus includes measuring heads having contacts cooperating with points of the openings of the cage and a processing unit connected to the measuring heads. The processing unit provides signals indicating the positions of the central points of the openings, determines a reference geometric plane which is the plane nearest, on the average, to the central points and determines the distances of the central points from the reference geometric plane.

25 Claims, 7 Drawing Figures

APPARATUS FOR CHECKING THE CAGE OF A CONSTANT VELOCITY JOINT

This is a continuation-in-part application of application Ser. No. 74,653, now abandoned, filed Sept. 12, 1979.

The present invention relates to an apparatus for checking the cage of a constant velocity joint, the cage including an outer wall with openings for housing the joint balls.

One of the most used types of constant velocity joints for frontwheel drive motor vehicles is comprised of an outer main member, or bell member, having a splined shaft meshing with the wheel hub; an inner member, called a second main ball member, coupled to the drive shaft of one of the front wheels of the vehicle; an intermediate member, called a ball cage; and six balls housed in relevant openings of the cage and cooperating with the bell member and the second main ball member.

The operation of this type of joint is well-known and is not described herein except, in part, for the cage.

The function of the cage is to hold the six balls, permitting the transmission of the rotary movement from the second to the first main member and thus to the wheel.

Figure 1:
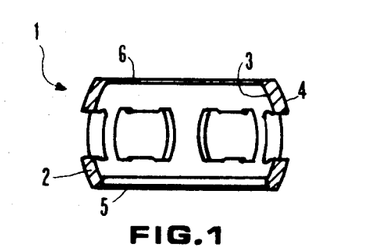
FIG. 1 is a vertical section of the cage of a constant velocity joint.
Figure 2:
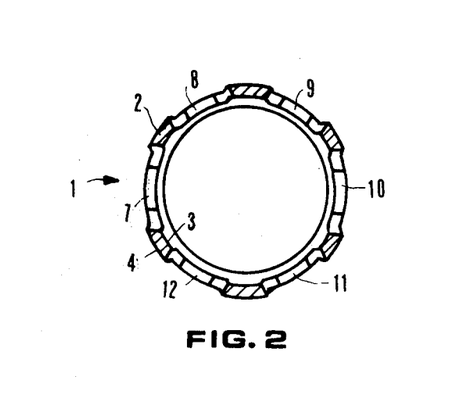
FIG. 2 is a horizontal section of the cage of a constant velocity joint.

With reference to FIGS. 1 and 2, the cage 1 comprises an outer wall 2 having an inner surface 3 and an outer surface 4, constituted by portions of theoretically concentric spherical surfaces, and two plane base surfaces 5, 6, having the shape of circular crowns.

The outer wall of cage 1 has six openings 7, 8, 9, 10, 11, 12 which serve, as previously mentioned, to house the joint balls.

In order that a correct and lasting working may be obtained, the different elements of the joints must have rather narrow constructional tolerances and therefore it is important to check them, after machining, their main dimensions and geometrical characteristics. With regard to the cage, it is deemed that in view of its shape and particular functions, checking, for example the diameters and coplanarity, carried out in a conventional way is not sufficient.

Thus, an object of the invention is to provide an apparatus having features particularly suited for this type of piece, so that the piece may be checked in a novel and really effective manner.

A secondary object is to provide an apparatus capable of checking the cage in a single checking station, within a short checking time and relatively low construction cost.

These and other objects and advantages are attained by an apparatus for checking the cage of a constant velocity joint, the cage including an outer wall with openings for housing the joint balls. The apparatus comprises, according to the invention, checking means with checking elements adapted to cooperate with points of the periphery of the openings and processing means connected to the checking means, the processing means including first and second processing circuits, the first processing circuits being adapted to process signals provided by the checking means for providing signals responsive to the positions of the central points of the openings, the second processing circuits being connected to the first processing circuits for defining a reference geometric plane, and for providing measurement signals responsive to the distances of said central points from the reference geometric plane, for checking the coplanarity of the central points.

The apparatus permits checking the height of the openings and the coplanarity of the centers of the openings. The checking of coplanarity is carried out assuming that the central points, or centers, of the openings lie on determined generatrices of the same cylindrical surface. The geometric plane nearest, on the average, to the centers of the openings is detected, preferably by the method of least squares and the distances of the centers of the openings from this plane are measured.

According to another feature of the invention, the checking means comprise further checking elements for cooperating with points of the cage outer wall along diametral directions and the processing means comprise third processing circuits for obtaining further measurement signals responsive to the diametral dimensions of the outer wall of the cage and to the position of the center or centers of the outer wall, the second processing circuits being connected to the third processing circuits for defining the reference geometric plane depending, too, on the position of the center of centers of the outer wall, and for providing the relevant measurement signals depending on the differences among the distances, from the reference plane, of the centers of the openings and of at least one of the centers of the outer wall.

The invention will be described in detail with reference to the annexed drawings, given for exemplary and not limiting purpose, in which.

Figure 3:
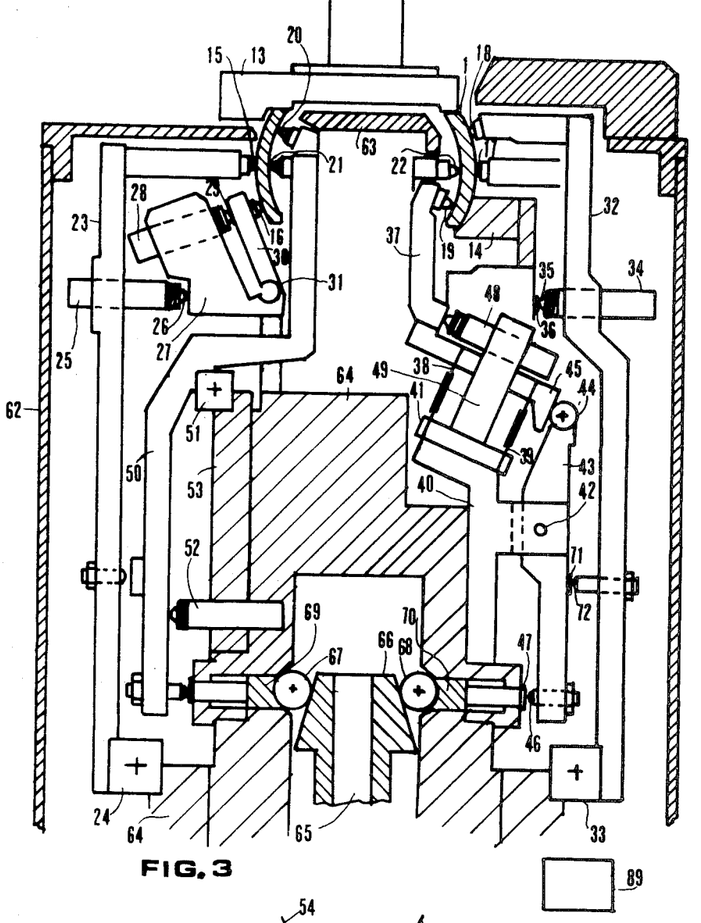
FIG. 3 is a simplified vertical section of an apparatus for checking the cage of FIGS. 1 and 2, according to the preferred embodiment of the invention.

With reference to FIG. 3, the cage 1 to be checked is maintained in measuring position by a thrusting device 13, vertically movable, which thrust the cage through springs, not shown, towards three rests, one of which, 14, is shown in the figure. Mechanical references, not shown, guarantee the suitable angular positioning of the cage, cooperating, preferably, with the periphery of one or more openings. Thrusting device 13 can be lifted an amount sufficient to permit the loading and unloading of the cage. In view of the positioning of the cage 1 assured by the above mentioned rests 14 and mechanical references, it is possible to define a cartesian system of coordinates (X, Y, Z), fixed to rests 14, to be used as a reference for the measurements and their processing, as will be described hereinafter.

In the meridian plane of cage 1 corresponding to the plane of FIG. 3 there are arranged eight contacts 15–22. Contact 15 is rigidily coupled to an arm 23 movable about a fulcrum 24. Arm 23, on its turn, carries a measuring head 25, of "cartridge" type, having a contact 26 in touch with a reference surface of a member 27.

To member 27 is fixed another measuring head 28 having its contact 29 in touch with an arm 30 movable about a fulcrum 31. Contact 16 is fixed to arm 30. Contact 17 is in touch with a point of the equatorial plane of the outer surface of the cage diametrically opposite to the point touched by contact 15. Contact 18 touches a point of the outer surface of the cage diametrically opposite to the point touched by contact 16; the two contacts 16, 18 are respectively symmetrically arranged above and below the equatorial plane of cage 1. Contact 18 is fixed to an arm 32 movable about a fulcrum 33.

The position of arm 32 is detected by a measuring head 34 having its contact 35 in touch with a fixed reference surface 36.

Contact 19 is rigidly fixed to an arm 37 which is supported by a parallelogram type set including two flexible laminae 38, 39. A stationary member 40 carries a plate 41 supporting two ends of laminae 38, 39 and a pin 42 about which is pivotable a transmission lever 43. At one end of lever 43 is rotatably mounted a roller 44, which can cooperate with a reference surface of an element 45 fixed to arm 37. Lever 43 has at its other end a reference element 46 cooperating with a reference surface 47.

The position of arm 37 is detected by a measuring head 48 fixed to a stationary support 49. Contact 20 is in touch with a point of the inner surface of the cage diametrically opposite to the point touched by contact 19; the two contacts 19, 20 are symmetrically arranged, respectively below and above the equatorial plane of cage 1. Contacts 21, 22 touch two diametrically opposite points of the inner surface of the cage, which lie in the equatorial plane of the cage.

Contact 21 is fixed to an arm 50 movable about a fulcrum 51. The position of arm 50 is detected by a measuring head 52 fixed to support 53 coupled to the frame of the apparatus.

The apparatus further includes (FIG. 4) two contacts 54, 55 in touch with points of the outer equatorial circumference of the cage which lie in a vertical plane forming an angle of 60° with the plane of FIG. 3, and two contacts 56, 57 in touch with points of the outer equatorial circumference of the cage which lie in a vertical plane forming an angle of 60° with the plane passing through contacts 54, 55. Two contacts 58, 59 are in touch with points of the inner equatorial circumference of the cage which lie in the same plane passing through contacts 54, 55 and two contacts 60, 61 are in touch with points of the inner equatorial circumference of the cage lying on the same plane passing through contacts 56, 57.

Figure 4:
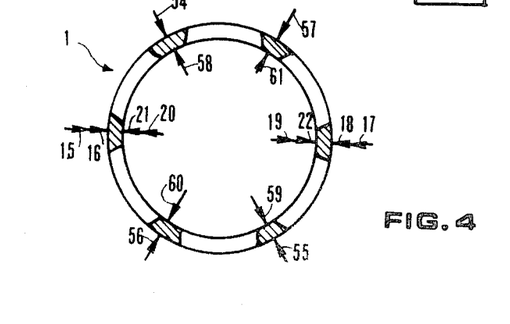
FIG. 4 is a plan view of the arrangement of the contacts of the apparatus of FIG. 3 which carry out checks, along diametral directions, on the inner surface and the outer surface of the cage.

Movable arms, transmission levers and measuring heads, not shown, are also associated with contacts 17, 20, 22, 54–61 for detecting the position of the relevant contacts. Two shells 62, 63 fixed to frame 64 protect the contacts and the associated element described above.

For permitting the loading and unloading of cages 1 there is provided a retraction device for contemporaneously retracting all the contacts of FIGS. 3 and 4 from the measuring position. This device includes a shaft 65 suitably guided vertically and a tapered truncated element 66 acting, through rollers 67, 68, pistons 69, 70, reference elements and transmission levers, on the arms carrying the contacts. Thus, for example, roller 68, when it is displaced towards the outside, makes lever 43 rotate counterclockwise, through reference surface 47 contacting reference element 46. Consequently reference element 71 fixed to lever 43, acting on reference element 72 fixed to arm 32, makes the latter rotate clockwise retracting contact 18 from the outer surface of the cage, while are 37, thrusted by roller 44, retracts contact 19 from the inner surface of the cage.

Figure 5:
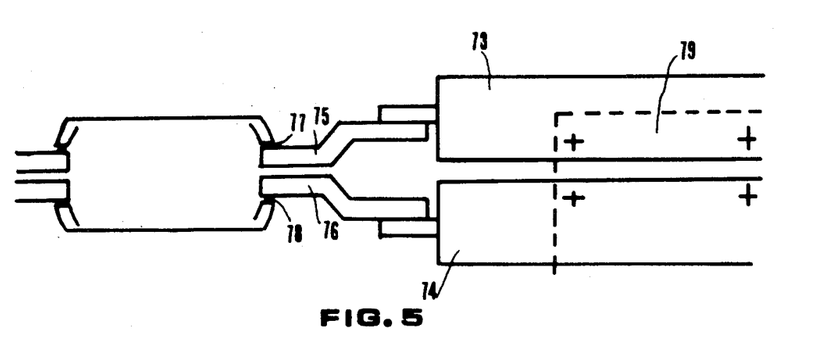
FIG. 5 is a simplified vertical section of the apparatus of FIGS. 3 and 4, along a plane passing through the central points of two opposed openings of the cage, perpendicularly to the base surface of the cage.
Figure 6:
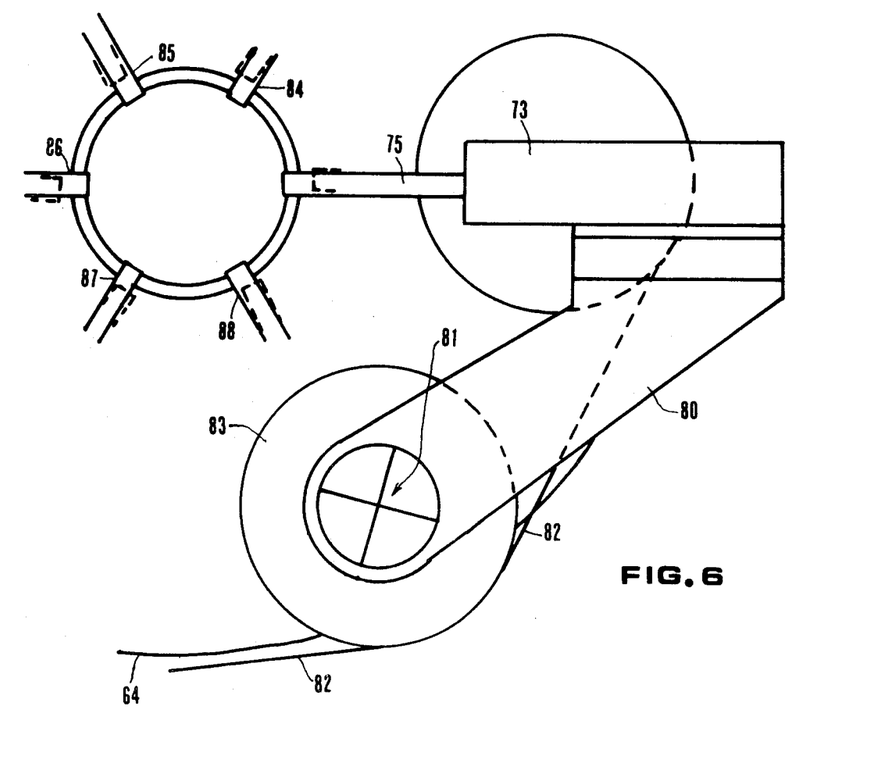
FIG. 6 is a partial plan view of the apparatus of FIGS. 3 to 5, showing the arrangement of the measuring heads which check the cage openings.

With reference to FIGS. 5 and 6, the apparatus comprises six pairs of measuring heads for checking the cage openings. One pair of heads 73, 74 is shown in FIG. 5. Heads 73, 74, which comprise relevant movable arms 75, 76 with contacts 77, 78, are fixed to a plate 79 fixed to an arm 80 (FIG. 6).

Arm 80 is supported by a fulcrum 81 constituted by two perpendicular laminae. Arm 80 can be made to rotate about fulcrum 81 by a control device including a belt 82 and pulley 83.

Similar support and control devices are foreseen for the other heads, of which are partially shown only movable arms 84, 85, 86, 87, 88.

To permit the loading and unloading of the cages 1, the six pairs of heads are contemporaneously displaced by belt 82 in such a way as to move the movable arms to the positions shown, for arms 75, 84–88, by dashed lines ("retraction" positions).

All the measuring heads described with reference to FIGS. 3 to 6 are connected to a detecting, processing and monitoring unit 89 (FIG. 3).

Figure 7:
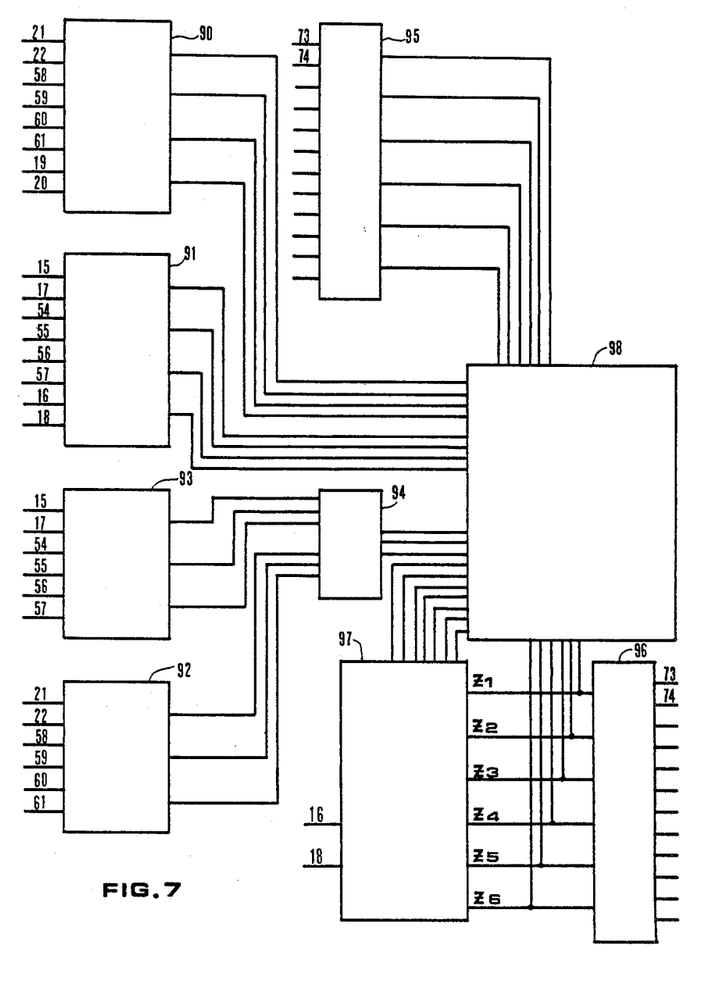
FIG. 7 is a block diagram of the detecting and processing circuits of the apparatus of FIGS. 3 to 6.

With reference to FIG. 7, the operation of the apparatus will be now described.

Before loading a cage the measuring heads are moved to the retraction position actuating shaft 65 and belt 82. After loading the cage, the heads are moved to the measuring position and the following checks are carried out.

By summing through circuit 90 of unit 89 the signals provided by the pair of heads having the contacts 21, 22; 58, 59; 60, 61 three diameters of the inner surface of the cage are measured; a fourth diameter of the cage inner surface is measured summing the signals of the heads comprising contacts 19, 20. In a circuit 91 the signals of the pairs of heads comprising contacts 15, 17, 54–57 are summed so as to measure three diameters of the cage outer surface; a fourth diameter of this surface is measured by summing the signals of the heads comprising contacts 16, 18.

As a matter of fact, since the measuring heads are constituted by comparator gauges, the measured quantities are the deviations of the diameters from their nominal values.

By calculating through a circuit 92 of unit 89 half of the difference of the two signals of the pairs of heads having the contacts 21, 22; 58, 59; 60, 61 three distinct checkings of the positions of the center of the cage inner surface with respect to the cartesian system of coordinates (X, Y, Z) are carried out. Similarly, by calculating through a circuit 93 of unit 89, half of the difference of the two signals of the pairs of heads having contacts 15, 17; 54, 55; 56, 57 three distinct checkings of the position of the center of the cage outer surface with respect to the cartesian system of coordinates (X, Y, Z) are carried out.

By calculating, through a circuit 94 of unit 89, the difference of the signals obtained in this way, it is possible to carry out three checkings of the concentricity between the outer and inner surfaces of the cage, along the straight lines passing through contacts 15, 17, 21, 22;

54, 55, 58, 59; 56, 57, 60, 61. The maximum of the three values obtained in this way can be assumed, with good approximation, as measurement of the concentricity error of the two surface in the equatorial plane. It is also possible, by processing the signals responsive to the positions of contacts 16, 18 and 19, 20 of FIG. 3, to check the concentricity of the two surfaces in the direction of the cage axis.

The heights of openings 7–12 or, more exactly, the deviations from the nominal height are measured by summing through a circuit 95 of unit 89 the two signals of each of the six pairs of heads described with reference to FIGS. 5 and 6.

By calculating half of the difference of the same signals in a circuit 96 of unit 89, indications are obtained about the height of the centers of the openings or, more exactly, the deviations zi (i=1÷6) in vertical direction (the Z direction) from the nominal positions of the centers with respect to the cartesian system of coordinates (X, Y, Z).

The most complex check carried out by the apparatus is that relating to the coplanarity of the centers of the openings and/or the coplanarity of the same centers and of one or both the centers of the cage inner and outer surfaces.

In particular, the most significant check, relating to the complanarity of the centers of the openings and of the center of the outer surface, is carried out on the basis of the following arguments and processing.

The reference geometric plane which is nearest, on the average, to the seven centers is determined.

The reference plane is determined by utilizing the known method of least squares (see, for example the book "Statistical treatment of experimental data" by Hugh D. Young, McGraw-Hill Book Company, Inc., 1962 Library of Congress Catalog Card Number 62-16764, pages 101 to 132), which is now summarized with regard to the particular application.

It is assumed that in a Cartesian space (X,Y,Z) in correspondence of N pairs of coordinates $x_i$, $y_i$ (i=1÷N) the ordinates $z_i$ are known; moreover it is assumed to have a function $z=f(x,y)$ of known form, of which it is desired to determine some parameters which characterize the function in such a way that it approximates in the best way the given points $(x_i, y_i, z_i)$.

The best approximation is obtained in the condition in which is minimized the sum of the squares of the N distances in Z direction $/d_i/ = / f(x_i, y_i) - Z_i /$ of the known points $(x_i, y_i, z_i)$ from those of the curve defined by the function.

Therefore it is necessary to minimize the sum:

$$\sum_1^N (d_i)^2 = \sum_1^N /f(x_i,y_i) - z_i/^2$$

Indicating with $A_j$, with j=1÷k, the parameters to be determined, the condition which must be satisfied for said sum to be a minimum is that all of the partial derivatives be equal to zero:

$$\frac{\partial \sum_1^N [f(x_i,y_i) - z_i]^2}{\partial A_j} = 0$$

for j=1÷k.

Therefore it is necessary to solve a system of k equations with k unknowns, which can be written as follows:

$$\sum_1^N \frac{\partial [f(x_i,y_i) - z_i]^2}{\partial A_j} = 0 \quad (1)$$

In the application relating to the present invention it is assumed that the measuring heads described with reference to FIGS. 3 to 6 are zero set with reference to the theoretic equatorial plane of the cage (plane z=0 in the system of coordinates X,Y,Z). Moreover it is assumed that the six centers of the openings lie on generatrices of a same cylindrical surface having axis Z (this axis passing through the center of the surface to the outer cage) and radius R and that these generatrices lie on three planes passing through the axis Z, each plane being angularly spaced 60° with regard to the preceding plane. The value R corresponds to the distance of the contacts of the heads of FIGS. 5 and 6 from the axis Z and is known.

The function to be obtained corresponds to the above mentioned reference plane. Therefore, assuming that the center of the outer cage surface lies on the Z axis, it is:

$$f(x,y) = ax + by + c$$
$$i = 1 \div 7 \quad j = 1 \div 3$$

where the values of i from 1 to 6 refer to the centers of openings 7–12, respectively, and i=7 refers to the center of the outer surface of the cage.

$$A_1 = a \quad A_2 = b \quad A_3 = c$$
$$x_i = R \cos \theta_i \quad (i = 1 \div 6)$$
$$y_i = R \sin \theta_i \quad (i = 1 \div 6)$$
$$\theta_1 = 0, \theta_2 = 60°, \theta_3 = 120°, \theta_4 = 180°, \theta_5 = 240°, \theta_6 = 300°$$
$$x_7 = y_7 = 0$$

By solving the system (1) the values of the unknowns a,b,c are found:

$$a = \frac{1}{3R} \sum_1^6 z_i \cos \theta_i \quad b = \frac{1}{3R} \sum_1^6 z_i \sin \theta_i \quad c = \frac{1}{7} \sum_1^7 z_i$$

A group 97 of unit 87 receives from circuit 96 signals responsive to the values $z_1$ to $z_6$, respectively, and also, from heads 28 and 34, signals responsive to the positions of contacts 16 and 18. Group 97 calculates, from the latter signals, a signal responsive to the value $z_7$, i.e. to the distance of the center of the cage outer surface from the plane z=0. Moreover, group 97 calculates, according to the preceding formulas, the unknowns a,b,c and having thus determined the reference plane, the same group 97 calculates the axial distances $d_i$ (along the Z axis) of the centers of the openings from the reference plane:

$$d_i = z_i - (ax_i + by_i + c) \quad i = 1 \div 6$$

Then group 97 calculates the differences $d_i$–$d_7$, namely:

$$D_i = z_i - z_7 - ax_i - by_i \quad i = 1 \div 6 \text{ in fact:}$$
$$x_7 = y_7 = 0 \text{ and } d_7 = z_7 - c.$$

These distances $D_i$ are assumed to be indicative of the coplanarity error of the centers of the openings and of the center of the cage outer surface and are visualized, together with the results of the processing carried out by circuits 90, 91, 92, 93, 94, 95, 96, on a monitoring group 98.

The execution in the described way of the coplanarity check of the centers of the openings (and of one or both the centers of the cage outer and inner surfaces) is particularly important and advantageous. The check could be made in a simpler way, for example with reference to base surface 5 or 6. In this case, however, the checks would be scarcely significant because it is possible that, in a cage having openings and outer and inner surfaces exactly machined and capable to guarantee a perfect working, the plane passing through the centers of the openings and of the inner and outer surfaces is not parallel to the plane, or planes, of the base surfaces.

It is evident that the described apparatus can be equipped with loading, unloading and sorting devices in order to obtain an operation more or less automatized.

It is also evident that the arrangement of the contacts can be modified and that the apparatus can foresee a plurality of checking stations instead of a single station.

What is claimed is:

1. Apparatus for checking the cage of a constant velocity joint, said cage having an outer wall with openings for housing the joint balls, comprising: first support means for supporting the cage; checking means; second support means, coupled to the first support means, for supporting the checking means; the checking means comprising checking elements for cooperating with points along the periphery of the openings, the checking means providing signals corresponding to the positions of the points with respect to the second support means; and processing means connected to the checking means; the processing means including first and second processing circuits, the first processing circuits being adapted to process the signals provided by the checking means for providing signals representative of the positions of the central points of the openings, the second processing circuits being connected to the first processing circuits for defining a reference geometric plane with respect to the relative positions of the central points and for providing measurement signals substantially representative of the distances of said central points from the reference geometric plane whereby the coplanarity of the central points is checked.

2. The apparatus according to claim 1, wherein said checking means comprise further checking elements for cooperating with points of the cage outer wall along diametral directions, the checking means providing further signals representative of the positions of the further checking elements, and wherein the processing means comprises third processing circuits connected to the checking means for obtaining measurement signals substantially representative of the position of at least one center of said outer wall, said second processing circuits being connected to the third processing circuits for providing reference geometric plane depending on the position of the central points of the openings and on the position of the outer wall center, the second processing circuits being adapted to provide signals substantially representative of the differences of the distances of said central points and the distance of said outer wall center from the reference plane.

3. The apparatus according to claim 2, wherein said outer wall center is the center of the cage outer surface.

4. The apparatus according to one of claims 1 to 3, wherein said processing means are adapted to define said reference plane by the method of least squares.

5. The apparatus according to claim 4, wherein said cage defines a longitudinal geometric axis, and wherein said checking elements cooperating with the periphery of the openings comprise a plurality of contacts, with at least two contacts for each opening cooperating with two points of the opening spaced along the direction of the geometric axis, said processing means further comprising fourth processing circuits for obtaining signals substantially representative of the heights of the openings along said geometric axis.

6. The apparatus according to claim 2, wherein the checking means comprise measuring devices adapted to detect at least six dimensions of the cage outer surface, along diametral directions.

7. The apparatus according to claim 6, wherein the checking means comprise further measuring devices adapted to detect at least six dimensions of the cage inner surface, along diametral directions.

8. The apparatus according to claim 7, wherein said processing means are adapted to provide signals responsive to the possible concentricity errors of the cage inner and outer surfaces.

9. The apparatus according to claims 6 or 7, including a device for contemporaneously retracting all the measuring devices adapted to detect dimensions of the cage inner and outer surfaces.

10. The apparatus according to claims 6 or 7, wherein said processing means are adapted to check three diameters of the inner surface and three diameters of the outer surface in an equatorial plane of the cage, along three directions forming angles of 60°.

11. The apparatus according to claims 6 or 7 wherein the further checking elements comprise two measuring devices for detecting a diametral dimension of the cage inner surface, in a plane inclined with respect to the equatorial plane, and two measuring devices for detecting a diametral dimension of the cage outer surface in another plane inclined with respect to the equatorial plane.

12. The apparatus according to claim 1, including a device for contemporaneously retracting all the checking elements adapted to cooperate with points of the periphery of the openings.

13. The apparatus according to claim 1, wherein said checking means comprise further checking elements for cooperating with points of the cage outer wall along diametral directions, the checking means providing further signals representative of the positions of the further checking elements, and wherein the processing means comprises third processing circuits connected to the checking means for obtaining measurement signals substantially representative of the position of at least one center of said outer wall, said second processing circuits being connected to the third processing circuits for providing the reference geometric plane depending on the position of the central point of the openings, and on the position of the outer wall center, the second processing circuits being adapted to provide signals substantially representative of the distances of said central points and of the outer wall center from the reference geometric plane whereby the coplanarity of the central points and of the outer wall center is checked.

14. The apparatus according to claim 13, wherein the second processing circuits are adapted to provide signals substantially representative of the differences of the distances of said central points and the distance of said outer wall center from the reference plane.

15. Apparatus for checking the cage of a constant velocity joint, said joint having an outer wall with openings for housing the joint balls, comprising: first support means for supporting the cage; checking means; second support means, coupled to the first support means, for supporting the checking means; the checking means comprising checking elements cooperating with points of the periphery of the openings, the checking means providing signals indicative of the positions of these points with respect to the second support means; and processing means connected to the checking means, the processing means processing the signals provided by the checking means for providing signals substantially representative of the positions of the central points of the openings and for defining a reference geometric plane relative to the positions of the central points, the processing means further providing measurement signals substantially representative of the distances of the central points from the reference geometric plane for checking the coplanarity of the central points.

16. The apparatus according to claim 15, wherein said checking means comprises further checking elements for cooperating with points of the cage outer wall along diametral directions, the checking means providing further signals representative of the positions of the further checking elements, and wherein the processing means are connected to the checking means for obtaining measurement signals substantially representative of the position of at least one center of said outer wall and for defining the reference geometric plane depending on the position of the central points of the openings and on the position of the outer wall center, the processing means being adapted to provide signals substantially representative of the difference of the distances of said central points and of the distance of said outer wall center from the reference plane.

17. The apparatus according to one of the claims 15 or 16, wherein said processing means defines said reference plane from received data using the method of least squares.

18. The apparatus according to claim 17, wherein said cage defines a longitudinal geometric axis, and wherein said checking elements cooperating with points of the periphery of the openings comprise a plurality of contacts, with at least two contacts for each opening cooperating with two points of the opening spaced along the direction of the geometric axis, said processing means providing signals substantially representative of the heights of the openings along said geometric axis.

19. The apparatus according to claim 15, wherein the checking means comprise measuring devices adapted to detect at least six dimensions of the cage outer surface, along diametral directions.

20. The apparatus according to claim 19, wherein the checking means comprise further measuring devices adapted to detect at least six dimensions of the cage inner surface, along diametral directions.

21. The apparatus according to claim 20, wherein said processing means are adapted to provide signals representative of the possible concentricity errors of the cage inner and outer surface.

22. The apparatus according to claim 21, wherein said processing means are adapted to check three diameters of the inner surface and three diameters of the outer surface substantially in an equatorial plane of the cage, along three directions forming angles of 60°.

23. A method for checking the cage of a constant velocity joint having an outer wall with openings for housing the joint balls, comprising the steps of determining the positions of the central points of the openings, determining a reference geometric plane depending on the determined positions of the central points of the openings and determining the distances of said central points from the reference geometric plane, whereby the coplanarity of the central points is checked.

24. The method as set forth in claim 23, further comprising the step of determining the position of one center of said outer wall, and wherein the step of determining a reference geometric plane is carried out with information which identifies the position of said center of the outer wall, and the step of determining the distance of said center of the outer wall from the reference geometric plane.

25. The method as set forth in claim 24, wherein said outer wall center is the center of the cage outer surface.

* * * * *

UNITED STATES PATENT AND TRADEMARK OFFICE
CERTIFICATE OF CORRECTION

PATENT NO. : 4,364,181

DATED : December 21, 1982

INVENTOR(S) : ALBERTAZZI

It is certified that error appears in the above—identified patent and that said Letters Patent is hereby corrected as shown below:

```
Column 2, line 22, change "of" (second occurrence) to --or--.
Column 3, line 60, change "element" to --elements--.
Column 4, line 7, change "are" to --arm--.
Column 5, line 50, change "Z₁" to --z₁--.
Column 6, line 16, change "to" to --of--.
Column 8, line 59, change "point" to --points--
Column 6, line 39 change "∂" in every instance to --θ--.
```

Signed and Sealed this

Second Day of August 1983

[SEAL]

Attest:

GERALD J. MOSSINGHOFF

Attesting Officer

Commissioner of Patents and Trademarks